United States Patent [19]
Bushman

[11] Patent Number: 5,836,549
[45] Date of Patent: Nov. 17, 1998

[54] AIRFOIL LEADING EDGE WITH CAVITY

[75] Inventor: Boyd B. Bushman, Lewisville, Tex.

[73] Assignee: Lockheed Martin Corporation, Fort Worth, Tex.

[21] Appl. No.: 781,237

[22] Filed: Jan. 10, 1997

[51] Int. Cl.$^6$ .............................. B64C 3/16; B64C 3/36; B64C 11/18

[52] U.S. Cl. .................. 244/203; 244/35 R; 244/35 A; 244/123; 244/130; 416/235; 416/243

[58] Field of Search .................................... 244/198, 199, 244/201, 203, 204, 206, 35 A, 123, 124, 130, 35 R; 416/223 R, 235, 236 R, 243

[56] References Cited

U.S. PATENT DOCUMENTS

| | | | |
|---|---|---|---|
| 2,136,403 | 11/1938 | Vance et al. | 244/130 X |
| 2,916,230 | 12/1959 | Nial | 244/130 X |
| 3,568,956 | 3/1971 | Swanson | 244/206 |
| 4,405,102 | 9/1983 | Taylor | 244/35 A X |
| 5,299,762 | 4/1994 | Kosson et al. | 244/130 X |

Primary Examiner—William Grant
Attorney, Agent, or Firm—James E. Bradley

[57] ABSTRACT

A jet airplane capable of supersonic flight has airfoils with leading edges. Each leading edge has a cavity which extends for substantially the entire length of the airfoil. The leading edge also has a cover which is approximately the same size as the cavity. The cover has an open position and a closed position. When the cover is in the open position, the leading portion has a concave profile. When the cover is in the closed position, the leading portion has a convex profile that gives the airfoil a conventional shape. The cover is rotated to the open position when the airplane reaches supersonic speed. At supersonic speed, a shock wave forms on the leading edge of the airfoil. However, the cavity forms a compression zone between the shock wave and the leading edge, diverting the heat and pressure of the shock wave away from the airfoil. Downstream from the compressed zone, pressure wakes form along the airfoil and cool the airfoil. At subsonic speed, the cover is rotated to the closed position to achieve optimal airfoil efficiency.

18 Claims, 3 Drawing Sheets

AIRFOIL LEADING EDGE WITH CAVITY

TECHNICAL FILED

This invention relates in general to aircraft and in particular to supersonic airfoil leading edge design.

BACKGROUND ART

Airfoil design is a critical component to achieving optimal performance in both fixed airfoils such as wings, tails and vertical stabilizers, and rotary airfoils such as propeller blades. The upstream or leading edge designs of prior art airfoils are generally smooth, convex, aerodynamic shapes regardless of the speed of the airflow encountered by the airfoil. However, subsonic airflow and supersonic airflow have different behavior characteristics when obstructions are encountered. Leading edge designs that permit efficient performance in one type of airflow may not be as efficient in the other type of airflow. For example, airfoils which are designed for supersonic airflow perform less efficiently in subsonic airflow due to the very sharp cross-sectional shape at the leading edge. Moreover, supersonic airfoils require expensive heat-resistant materials to avoid thermal damage to the airfoil due to the very high temperatures developed by shock waves in supersonic airflow. Supersonic jet aircraft need a leading edge design that is capable of being optimal for each type of airflow.

Propellers are designed to operate at subsonic speeds, even at their tips. A higher rate of speed could increase the speed of the aircraft, but the prior art discourages tip velocities greater than supersonic.

DISCLOSURE OF THE INVENTION

A jet airplane capable of supersonic flight has a plurality of airfoils. Each airfoil has a leading portion located on the upstream side. The leading portion has a cavity defining two leading edges which are parallel to one another. The cavity extends for substantially the entire length of the airfoil along with the leading edges.

The leading portion also has a movable cover which is crescent-shaped and has approximately the same length and height as the cavity. The cover has an open position and a closed position. When the cover is in the open position, the leading portion has a concave profile. When the cover is in the closed position, the leading portion has a convex profile that gives the airfoil a conventional subsonic airfoil shape.

The airfoil contains a motorized actuator which has a housing, bearings and teflon-coated surfaces to support the cover. The actuator rotates the cover 180 degrees between the open and closed positions with a motor. The cover is rotated to the open position when the airplane reaches supersonic speed. The inner surface of the cover forms a closed base for the cavity. At supersonic speed, a shock wave forms on the leading portion of the airfoil. However, with a concave profile the leading portion forms a compression zone which becomes the effective leading edge of the airfoil. Located between the shock wave and the leading portion, the compression zone diverts the heat and pressure of the shock wave away from the airfoil. Downstream from the compressed zone, pressure wakes form along the lateral surfaces of the airfoil and cool the surfaces to a temperature below what would normally be encountered with a conventional airfoil. At subsonic speed, the cover is rotated to the closed position to achieve optimal airfoil efficiency. The cover is rotated to the proper position each time the sonic barrier is crossed. The concept of this invention may also be employed in rotary airfoils such as those in propeller and helicopter blades.

BEST MODE FOR CARRYING OUT THE INVENTION

Figure 1:
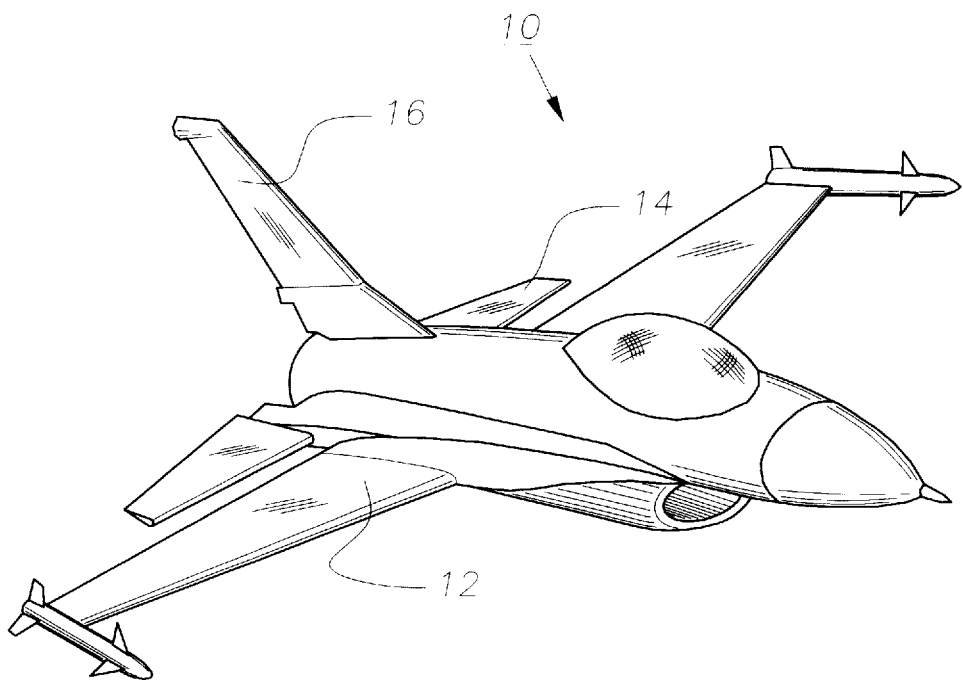
FIG. 1 is a schematic drawing of an airplane constructed in accordance with the invention.
Figure 2:
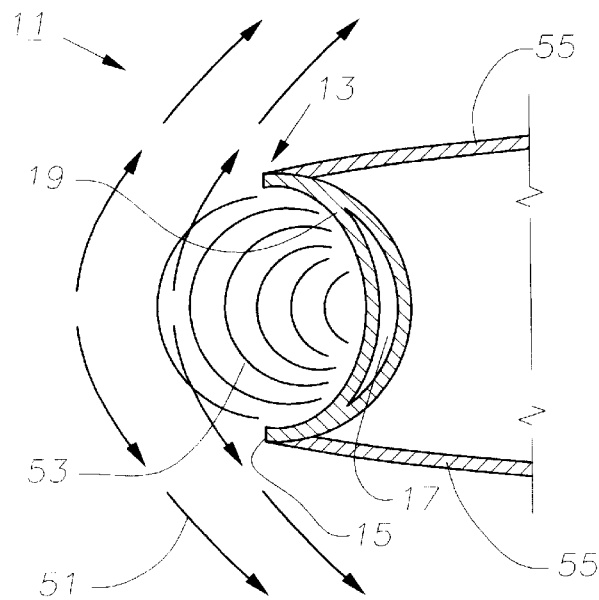
FIG. 2 is a partial sectional view of the leading edge of an airfoil on the airplane in FIG. 1 and is shown in an open position while encountering supersonic airflow.

Referring to FIG. 1, a jet airplane 10 capable of supersonic flight is shown. Airplane 10 has a plurality of airfoils 11 including wings 12, tail fins 14 and a vertical stabilizer 16. As shown in FIG. 2, each airfoil 11 has a leading portion 13 located on the upstream side of airfoil 11. Leading portion 13 has two leading edges 15 which are parallel to one another and a cavity 19. In the preferred embodiment, cavity 19 is concave in profile and extends for substantially the entire length of airfoil 11 along with leading edges 15. Cavity 19 has a height that is measured between leading edges 15. Cavity 19 is closed and extends downstream into airfoil 11 for a depth that is at least one half the height of cavity 19.

Leading portion 13 also has a movable canopy or cover 17. In the preferred embodiment, cover 17 is crescent-shaped and has approximately the same length and height as cavity 19. The midsection of cover 17, its widest point, has a depth that is approximately one fourth the depth of cavity 19. Cover 17 has an open position, shown in FIG. 2, and a closed position, shown in FIG. 3. When cover 17 is in the open position, leading portion 13 has a concave profile. The concave inner surface of cover 17 forms the base of cavity 19. When cover 17 is in the closed position, leading portion 13 has a convex profile that gives airfoil 11 a conventional subsonic airfoil shape.

Figure 3:
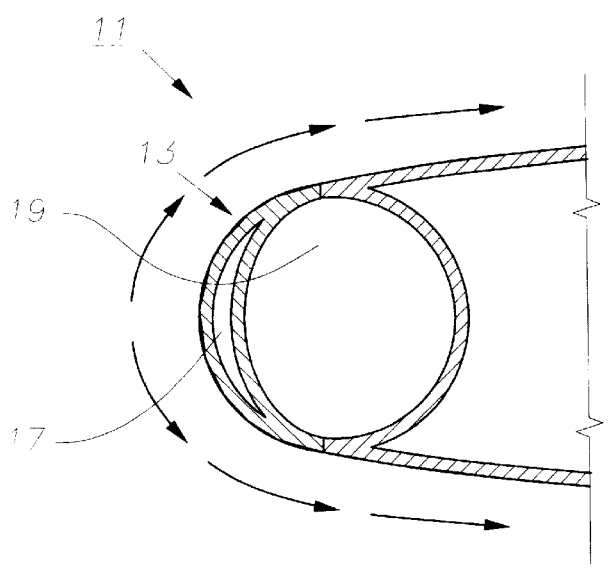
FIG. 3 is a partial sectional view of the leading edge of the airfoil of FIG. 2 and is shown in a closed position while encountering subsonic airflow.
Figure 4:
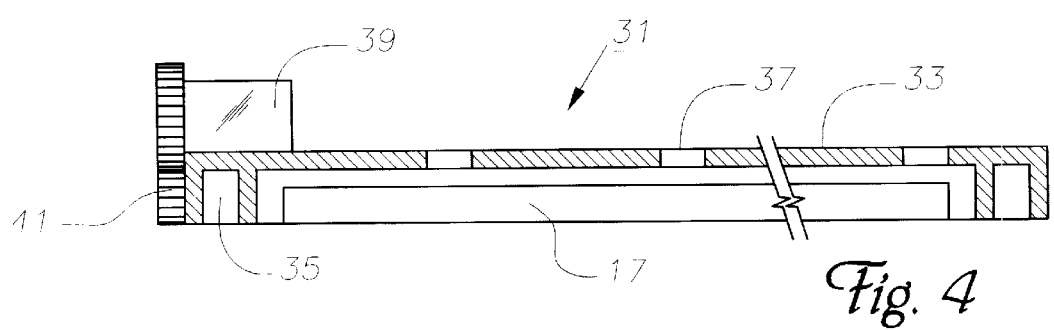
FIG. 4 is a top view of a mechanism for changing the profile of the leading edge of the airfoil of FIGS. 2 and 3 between the open and closed positions.

Referring to FIG. 4, airfoil 11 contains a motorized actuator 31. Actuator 31 is also located within leading portion 13 (not shown in FIGS. 2 and 3). Actuator 31 has a housing 33, bearings 35 and tefloncoated surfaces 37 to support cover 17. Actuator 31 rotates cover 17 180 degrees between the open and closed positions with a motor 39. Motor 39 drives gears 41 which drive cover 17 through bearings 35.

In operation, cover 17 is rotated to the open position when airplane 10 reaches supersonic speed (FIG. 2). At supersonic speed, a shock wave 51 forms on leading portion 13 of airfoil 11. However, with a concave profile, leading portion 13 forms a compression zone 53 which becomes the effective leading edge of airfoil 11. Located between shock wave 51 and leading portion 13, compression zone 53 diverts the heat and pressure of shock wave 51 away from airfoil 11. Downstream from compression zone 53, pressure wakes (not shown) form along the lateral or downstream surfaces 55 of airfoil 11, causing the ambient surrounding gas to expand. The expanding gas cools surfaces 55 of airfoil 11 to a temperature below what would normally be encountered with a conventional airfoil.

At subsonic speed, cover 17 is rotated to the closed position to achieve optimal airfoil efficiency (FIG. 3). Cover 17 is rotated to the proper position each time the sonic barrier is crossed.

Figure 5:
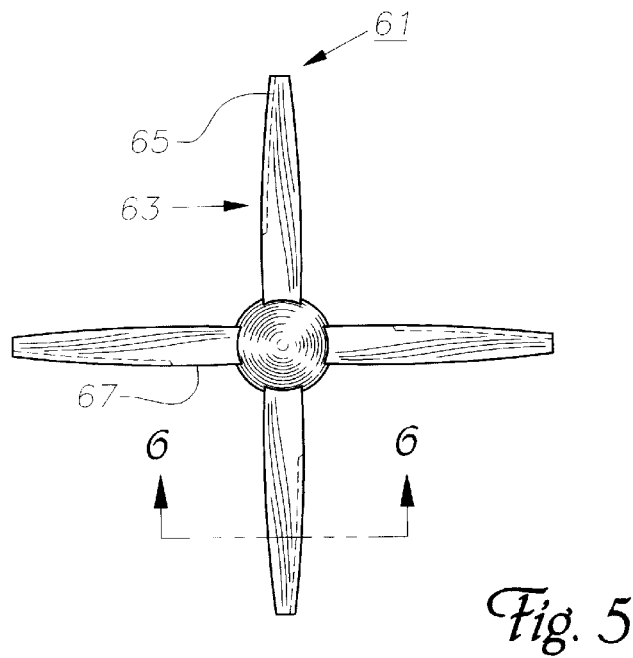
FIG. 5 is a front view of a propeller rotor with propeller blades constructed in accordance with the invention.
Figure 6:
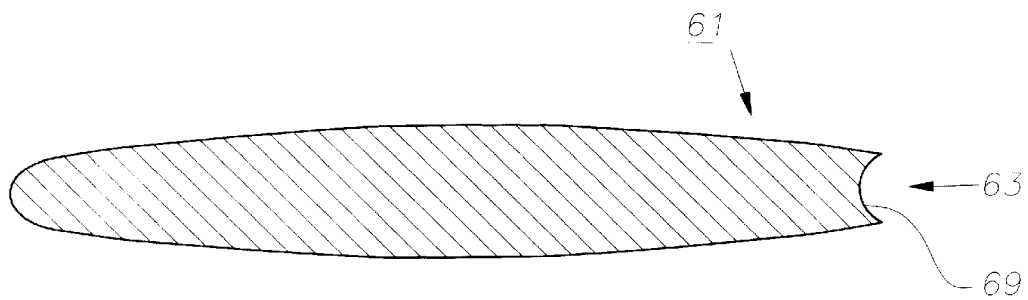
FIG. 6 is a sectional view of a propeller blade of FIG. 5 taken along the line 6—6.

The concept of this invention may also be employed in rotary airfoils such as those in propeller and helicopter blades. Referring to FIGS. 5 and 6, high speed propeller blades 61 with leading edges 63 are shown. At maximum speed, the radially outward sections 65 of propeller blades 61 have supersonic velocities while the radially inward sections 67 of propeller blades 61 have subsonic velocities. Outward sections 65 of edges 63 have a concave profile 69 similar to airfoil 11 in FIG. 2. Since inward sections 67 encounter subsonic airflow, they have a conventional aerodynamic profile similar to airfoil 11 in FIG. 3. A cover such as cover 17 of FIG. 2 is unnecessary.

Figure 7:
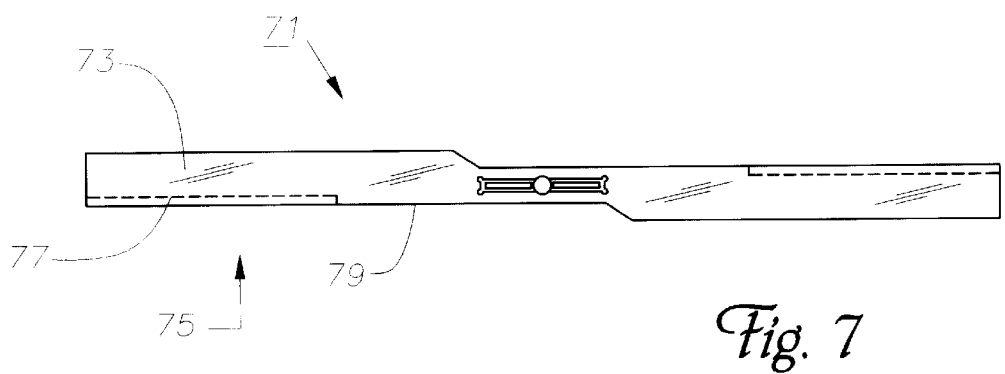
FIG. 7 is a top view of a helicopter main rotor with helicopter blades constructed in accordance with the invention.

Referring to FIG. 7, a main helicopter rotor 71 having two helicopter blades 73 with leading edges 75 is shown. Helicopter blades 73 are configured similarly to propeller blades 61. At maximum speed, the radially outward sections 77 of helicopter blades 73 have supersonic velocities while the radially inward sections 79 of helicopter blades 73 subsonic velocities. Outward sections 77 of leading edges 75 have a concave profile very similar to profile 69 in FIG. 6. Since inward sections 79 encounter subsonic airflow, they have a conventional aerodynamic profile very similar to inward sections 67 in FIG. 5. In supersonic airflow, the concave leading edge profile of both propeller blades 61 and helicopter blades 73 prevent temperature increase in the airfoils in the same way as airfoil 11 in FIG. 2. A cover such as cover 17 of FIG. 2 is not required. Although the sound emitted by the blades will increase in frequency, the sonic level of emissions will not increase due to sonic wavefront radial cancellation.

The invention has several advantages. When encountering supersonic airflow, the cavity along the leading edge permits superior flight efficiency by reducing drag and limiting the temperature increase in the airfoil. As a result less costly materials may be employed in the manufacture of the airfoil. The improved propeller also creates more lift than conventional propellers as the higher speed available enables a larger volume of air to flow over the surface of the blade, providing more thrust. With the reversible cover, the leading edge profile can be changed for optimal performance in both supersonic and subsonic airflow. The invention may be employed in airplane and reentry vehicle airfoils, and in helicopter and propeller blades.

While the invention has been shown in only three of its forms, it should be apparent to those skilled in the art that it is not so limited, but is susceptible to various changes without departing from the scope of the invention.

I claim:

1. An airfoil for an aircraft, comprising in combination:
    a leading portion;
    an unobstructed cavity formed in the leading portion and extending substantially the length of the airfoil, the cavity defining two parallel leading edges separated by the cavity, the cavity having a closed base and creating a shock wave forward of the leading portion while the airfoil is in supersonic airflow to retard temperature increase of the leading portion.

2. The airfoil according to claim 1 wherein the airfoil comprises an airplane wing.

3. The airfoil according to claim 1 wherein the airfoil comprises a propeller blade.

4. The airfoil according to claim 1 wherein the airfoil comprises a propeller blade, the propeller blade leading portion having a radially inward section and a radially outward section, the propeller blade being adapted to be rotated at a selected maximum speed at which the inward section is subjected to subsonic airflow while the outward section is subjected to supersonic airflow; and wherein
    the cavity is located on the outward section of the leading portion; and
    the inward section of the leading portion is convex and free of the cavity.

5. An airfoil for an aircraft, comprising in combination:
    a leading portion;
    a cavity formed in the leading portion, the cavity defining two parallel leading edges separated by the cavity, the cavity creating a shock wave forward of the leading portion while the airfoil is in supersonic airflow to retard temperature increase of the leading portion; and
    a movable aerodynamic cover for the cavity, the cover having a convex leading edge and being movable between a closed position for blocking the cavity in subsonic airflow conditions and an open position for exposing the cavity in supersonic airflow conditions.

6. The airfoil according to claim 5 wherein the cover forms a closed base for the cavity when in the closed position.

7. An airfoil for an aircraft, comprising in combination:
    a leading portion;
    an elongated cavity formed in the leading portion and extending substantially the length of the airfoil, the cavity creating a shock wave forward of the leading portion when supersonic airflow is encountered to retard temperature increase in the airfoil; and
    a movable aerodynamic cover for the cavity, the cover having a convex leading edge and being movable between a closed position for blocking the cavity in subsonic airflow conditions and an open position for exposing the cavity in supersonic airflow conditions.

8. The airfoil according to claim 7 wherein the cavity of the leading portion has a closed base.

9. The airfoil according to claim 7 wherein the cavity defines two parallel leading edges in the leading portion.

10. The airfoil according to claim 7 wherein the airfoil comprises a wing.

11. The airfoil according to claim 7 wherein the airfoil comprises a vertical stabilizer.

12. The airfoil according to claim 7 wherein the airfoil comprises an aircraft tail fin.

13. The airfoil according to claim 7 wherein the airfoil comprises a propeller blade.

14. An airplane capable of supersonic flight, comprising in combination:
    an airfoil having a leading portion;
    an elongated cavity formed in the leading portion and extending substantially the length of the airfoil, the cavity defining two parallel leading edges, and the cavity creating a shock wave forward of the leading portion during supersonic flight to retard temperature increase in the airfoil; and a movable aerodynamic cover for the cavity, the cover having a convex leading edge and being movable between a closed position for blocking the cavity during subsonic flight and an open position for exposing the cavity during supersonic flight.

15. The airplane according to claim 4, further comprising:

rotation means for rotating the cover from the open position to the closed position.

16. An aircraft, comprising in combination:

at least one propeller blade rotated about an axis, the propeller blade having a leading portion;

the leading portion having an aerodynamic radially inward section and a radially outward section, the propeller blade being adapted to be rotated at a selected maximum speed at which the inward section is subjected to subsonic airflow while the outward section is subjected to supersonic airflow; and an unobstructed cavity formed in and extending the length of the outward section of the leading portion of the propeller blade, the cavity defining two parallel leading edges separated by the cavity, the cavity having a closed base and creating a shock wave forward of the outward section when supersonic airflow is encountered.

17. A method for retarding temperature increase in an airfoil having a leading portion and a downstream surface while the airfoil is subjected to supersonic airflow, comprising in combination:

providing the leading portion with an unobstructed cavity having a closed base and extending substantially the length of the airfoil;

moving the leading portion of the airfoil through air at supersonic speed, causing a shock wave to form ahead of the airfoil because of the cavity;

forming a compression zone between the shock wave and the cavity, the compression zone diverting the heat and pressure of the shock wave away from the airfoil; and forming pressure wakes downstream from the compression zone along the downstream surface of the airfoil, thereby causing ambient gases to expand and retard temperature increase in the airfoil.

18. A method for retarding temperature increase in an airfoil having a leading portion and a downstream surface while the airfoil is subjected to supersonic airflow, comprising in combination:

providing the leading portion with an elongated cavity;

moving the leading portion of the airfoil through air at supersonic speed, causing a shock wave to form ahead of the airfoil because of the cavity;

forming a compression zone between the shock wave and the cavity, the compression zone diverting the heat and pressure of the shock wave away from the airfoil;

forming pressure wakes downstream from the compression zone along the downstream surface of the airfoil, thereby causing ambient gases to expand and retard temperature increase in the airfoil;

decreasing the speed of the airfoil through air to subsonic; and closing the cavity with a cover having a convex leading edge.

* * * * *